(12) United States Patent
Patel et al.

(10) Patent No.: US 10,095,632 B1
(45) Date of Patent: Oct. 9, 2018

(54) MEMORY AFFINITY MANAGEMENT

(71) Applicant: International Business Machines Corporation, Armonk, NY (US)

(72) Inventors: Mehulkumar Patel, Bangalore (IN); Vaidyanathan Srinivasan, Bangalore (IN); Venkatesh Sainath, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/905,884

(22) Filed: Feb. 27, 2018

Related U.S. Application Data

(63) Continuation of application No. 15/602,381, filed on May 23, 2017.

(51) Int. Cl.
| | | |
|---|---|---|
| *G06F 12/00* | (2006.01) | |
| *G06F 12/1045* | (2016.01) | |
| *G06F 12/14* | (2006.01) | |
| *G06F 12/1009* | (2016.01) | |
| *G06F 9/455* | (2018.01) | |

(52) U.S. Cl.
CPC ...... *G06F 12/1045* (2013.01); *G06F 9/45558* (2013.01); *G06F 12/1009* (2013.01); *G06F 12/145* (2013.01); *G06F 2009/45583* (2013.01); *G06F 2212/152* (2013.01);
(Continued)

(58) Field of Classification Search
CPC ............ G06F 12/1045; G06F 9/45558; G06F 12/145; G06F 12/1009; G06F 2009/45583; G06F 2212/684; G06F 2212/60; G06F 2212/50; G06F 2212/152
See application file for complete search history.

(56) References Cited

U.S. PATENT DOCUMENTS

| | | | | |
|---|---|---|---|---|
| 5,317,738 A | * | 5/1994 | Cochcroft, Jr. | ..... G06F 12/0842 711/118 |
| 6,769,017 B1 | * | 7/2004 | Bhat | ..................... G06F 9/5033 709/214 |

(Continued)

OTHER PUBLICATIONS

Cruz et al., "Hardware-Assisted Thread and Data Mapping in Hierarchical Multi-Core Architectures," ACM Transactions on Architecture and Code Optimization, vol. V, No. N, Article A, Publication date: January, 25 pages.

(Continued)

*Primary Examiner* — David X Yi
*Assistant Examiner* — Alan Otto
(74) *Attorney, Agent, or Firm* — Jared C. Chaney

(57) ABSTRACT

Disclosed aspects relate to memory affinity management in a shared pool of configurable computing resources that utilizes non-uniform memory access (NUMA). An access relationship is monitored between a set of hardware memory components and a set of software assets. A set of memory affinity data is stored. The set of memory affinity data indicates the access relationship between the set of software assets and the set of hardware memory components. Using the set of memory affinity data, a NUMA utilization configuration with respect to the set of software assets is determined. Based on the NUMA utilization configuration, a set of accesses pertaining to the set of software assets and the set of hardware memory components is executed.

1 Claim, 8 Drawing Sheets

(52) U.S. Cl.
CPC ...... *G06F 2212/50* (2013.01); *G06F 2212/60* (2013.01); *G06F 2212/684* (2013.01)

(56) References Cited

U.S. PATENT DOCUMENTS

| | | | |
|---|---|---|---|
| 7,673,114 | B2 | 3/2010 | Allen et al. |
| 9,043,563 | B2 | 5/2015 | Birkestrand et al. |
| 9,047,196 | B2 | 6/2015 | Gounares |
| 9,336,038 | B2 * | 5/2016 | Aslot .................. G06F 9/45558 |
| 9,465,669 | B2 | 10/2016 | Venkatasubramanian et al. |
| 2007/0073992 | A1 * | 3/2007 | Allen ...................... G06F 12/08 711/170 |
| 2012/0102258 | A1 * | 4/2012 | Hepkin ............... G06F 9/45558 711/6 |
| 2012/0198187 | A1 | 8/2012 | Accapadi et al. |
| 2013/0138885 | A1 | 5/2013 | Kurtz et al. |
| 2015/0347044 | A1 * | 12/2015 | Gschwind ............. G06F 3/0619 711/3 |
| 2017/0031819 | A1 | 2/2017 | Venkatasubramanian et al. |
| 2017/0060609 | A1 | 3/2017 | Cropper et al. |
| 2017/0116133 | A1 | 4/2017 | Kumar et al. |

OTHER PUBLICATIONS

Diener et al., "Kernel-Based Thread and Data Mapping for Improved Memory Affinity," Abstract/Research, printed May 17, 2017, 14 pages.

Gorman, "Foundation for automatic NUMA balancing," LWN.net, Nov. 6, 2012, 5 pages, https://lwn.net/Articles/523065/.

Jang, et al., "Application-Aware NoC Design for Efficient SDRAM Access," IEEE Transactions on Computer-Aided Design of Integrated Circuits and Systems, vol. 30, No. 10, Oct. 2011, 13 pages.

Unknown, "Does all running docker containers have a separate process ID," Stack Overflow, printed May 22, 2017, 1 page.

Unknown, "Get docker container id from container name," Stack Overflow, printed May 22, 2017, 1 page.

Patel et al., "Memory Affinity Management," U.S. Appl. No. 15/602,381, filed May 23, 2017.

List of IBM Patents or Patent Applications Treated as Related, dated Feb. 26, 2018, 2 pages.

"Accelerated Examination Support Document," International Business Machines Corporation, dated Feb. 26, 2018, 24 pages.

\* cited by examiner

700

| Number of accesses to chip 0 | Number of accesses to chip 1 | — — — | Number of accesses to chip N |

MEMORY AFFINITY MANAGEMENT

BACKGROUND

This disclosure relates generally to computer systems and, more particularly, relates to memory affinity management in a shared pool of configurable computing resources that utilizes non-uniform memory access (NUMA). The amount of resources that need to be managed in a shared pool of configurable computing resources is increasing. As resources needing to be managed increase, the need for memory affinity management in a shared pool of configurable computing resources may also increase.

SUMMARY

Aspects of the disclosure relate to a hardware-assisted estimation technique for memory access affinity tracking for a software context such as a set of containers, a set of virtual machines, a set of processes, or the like. The hardware-assisted estimation technique to track which memory non-uniform memory access (NUMA) node serviced the memory access from the given software context. Features may provide an approximation technique that makes use of a relatively fractional hardware enablement to allow software to trade-off accuracy and overhead cost. As such, an appropriate affinity estimation may be arrived-at and at least a portion of the data may be provided to a NUMA memory affinity management algorithms which may be included in an operating system layer or a hypervisor layer. Accordingly, disclosed aspects include a hardware cooperative technique to estimate memory affinity of a given software entity (e.g., thread, process, container) which is configured to execute on one or more processor cores/threads with relatively low overhead costs and relatively low complexity of implementation.

Disclosed aspects relate to memory affinity management in a shared pool of configurable computing resources that utilizes non-uniform memory access (NUMA). An access relationship is monitored between a set of hardware memory components and a set of software assets. A set of memory affinity data is stored. The set of memory affinity data indicates the access relationship between the set of software assets and the set of hardware memory components. Using the set of memory affinity data, a NUMA utilization configuration with respect to the set of software assets is determined. Based on the NUMA utilization configuration, a set of accesses pertaining to the set of software assets and the set of hardware memory components is executed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 illustrates an example related to memory affinity management in a shared pool of configurable computing resources that utilizes non-uniform memory access (NUMA), according to embodiments.

Figure 1:
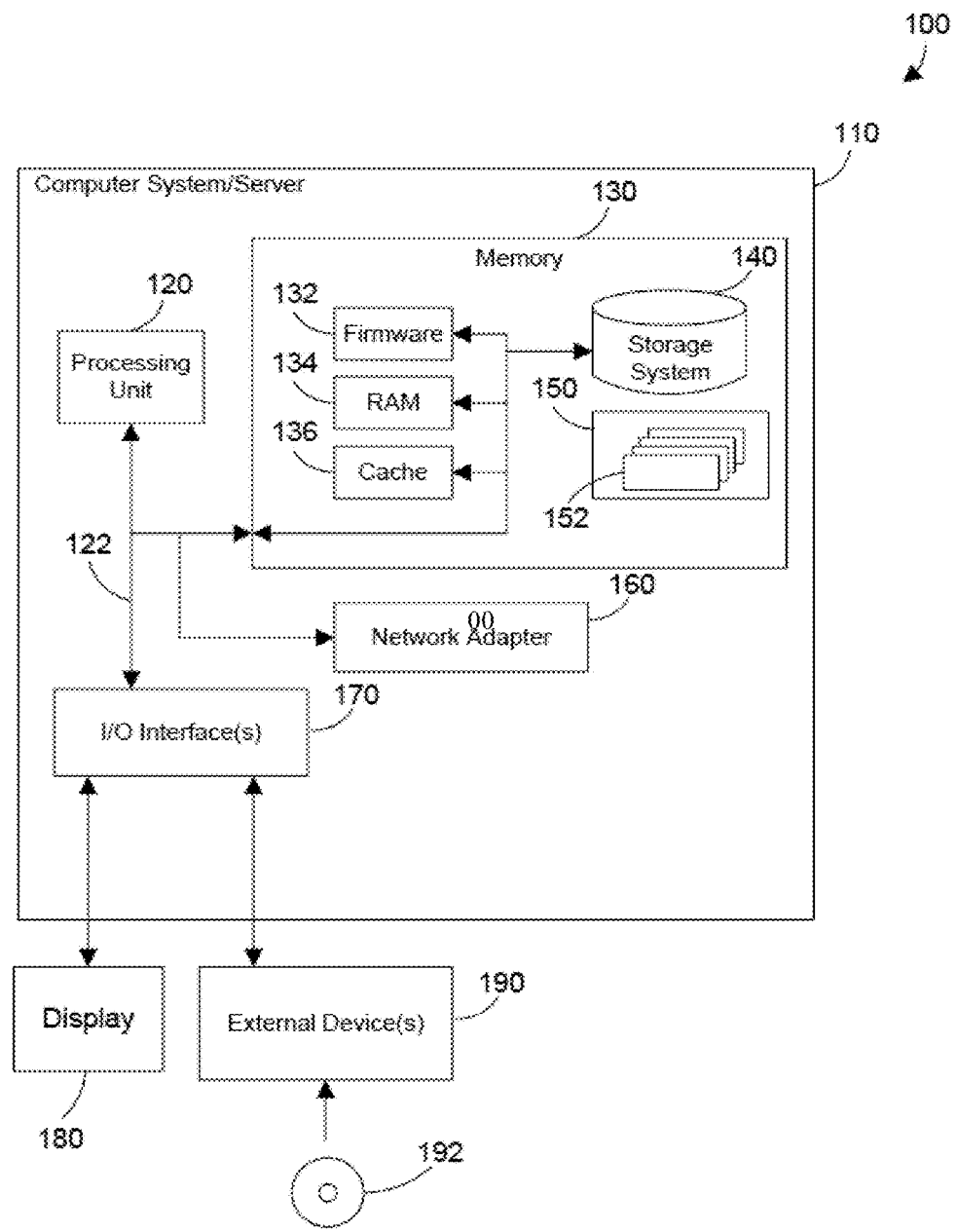
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to a hardware-assisted estimation technique for memory access affinity tracking for a software context such as a set of containers, a set of virtual machines, a set of processes, or the like. The hardware-assisted estimation technique tracks which memory non-uniform memory access (NUMA) node serviced the memory access from the given software context. Features may provide an approximation technique that makes use of a relatively fractional hardware enablement to allow software to trade-off accuracy and overhead cost. As such, an appropriate affinity estimation may be arrived-at/determined and at least a portion of the data may be provided to a NUMA memory affinity management algorithms which may be included in an operating system layer or a hypervisor layer. Accordingly, disclosed aspects include a hardware cooperative technique to estimate memory affinity of a given software entity (e.g., thread, process, container) which is configured to execute on one or more processor cores/threads with relatively low overhead costs and relatively low complexity of implementation.

On a large multi-socket/multi-node compute server, a memory subsystem can be organized for a NUMA memory model in order to accommodate various performance, capacity, or connectivity requirements. In NUMA systems, the compute entities (e.g., central processing unit (CPU)/cores) can have full access to all of system memory. However, there is a notion of near memory and far memory based on access latency of particular regions of memory from a given CPU or a compute entity. If an application is accessing a memory module which is locally attached to the processor chip where the application is executing instructions, it is resolved to be a near memory access. If an application is accessing a memory module which is not locally attached to the processor (where the application is executing instructions), it is resolved to be a far memory access. Near memory accesses are faster than far memory accesses. Accordingly, far memory accesses have higher access latency than near memory accesses. Given this notion of near memory and far memory, from the perspective of an application executing instructions on a given compute core, a memory management layer of an operating system or a hypervisor may desire to have memory accesses of an application be near memory accesses (e.g., local) to the extent possible. Features may relate to memory accesses to have positive impacts on memory affinity using allocation or migration techniques.

Aspects of the disclosure include a computer implemented method, a system, and a computer program product for memory affinity management in a shared pool of configurable computing resources that utilizes NUMA. An access relationship is monitored between a set of hardware memory components and a set of software assets. A set of memory affinity data is stored. The set of memory affinity data indicates the access relationship between the set of software assets and the set of hardware memory components. Using the set of memory affinity data, a NUMA utilization configuration with respect to the set of software assets is determined. Based on the NUMA utilization configuration, a set of accesses pertaining to the set of software assets and the set of hardware memory components is executed.

Features relate to a hardware-assisted estimation technique to derive readily actionable weighted memory access affinity tracking for a virtual machine, container, or a process from CPU performance monitoring unit (PMU) infrastructure which allows software to trade-off accuracy and overhead costs. The tracking mechanism may be selectively enabled or disabled. The PMU unit may be specially configured to capture the supplier source chip identifier in case of cache miss event. In addition, the PMU unit may differentiate cached data from another chip and memory accesses. Memory source tagging in translation lookaside buffers (TLBs), effective-to-real address translation (ERAT), TLB real-address based regions, or the like may be utilized by various aspects.

In embodiments, features utilize a hardware-software interface mechanism such as a special purpose register (SPR) to capture memory affinity information. The memory affinity information may be for a given software context identifier which can be readily consumed by the PMU framework in an operating system. Disclosed aspects include a thresholding and scaling mechanism in micro-code or hardware that can process the accumulated affinity data. The accumulated affinity data may be gathered over a given runtime of a process/context and provide an actionable vector of affinity information to operating system software. The accumulated affinity data may be normalized over time relative to a set of total memory accesses of a process or the like.

In embodiments, a set of events may be tracked using a set of identifiers related to the set of software assets. Such tracking of the set of events may correspond to the access relationship between the set of software assets and the set of hardware memory components. To track the set of events, detection of cache misses or memory accesses may be carried-out Elements can benefit application performance on a multi-chip computer or a computer system which has a NUMA-like memory design. Altogether, aspects of the disclosure can have performance or efficiency benefits. Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
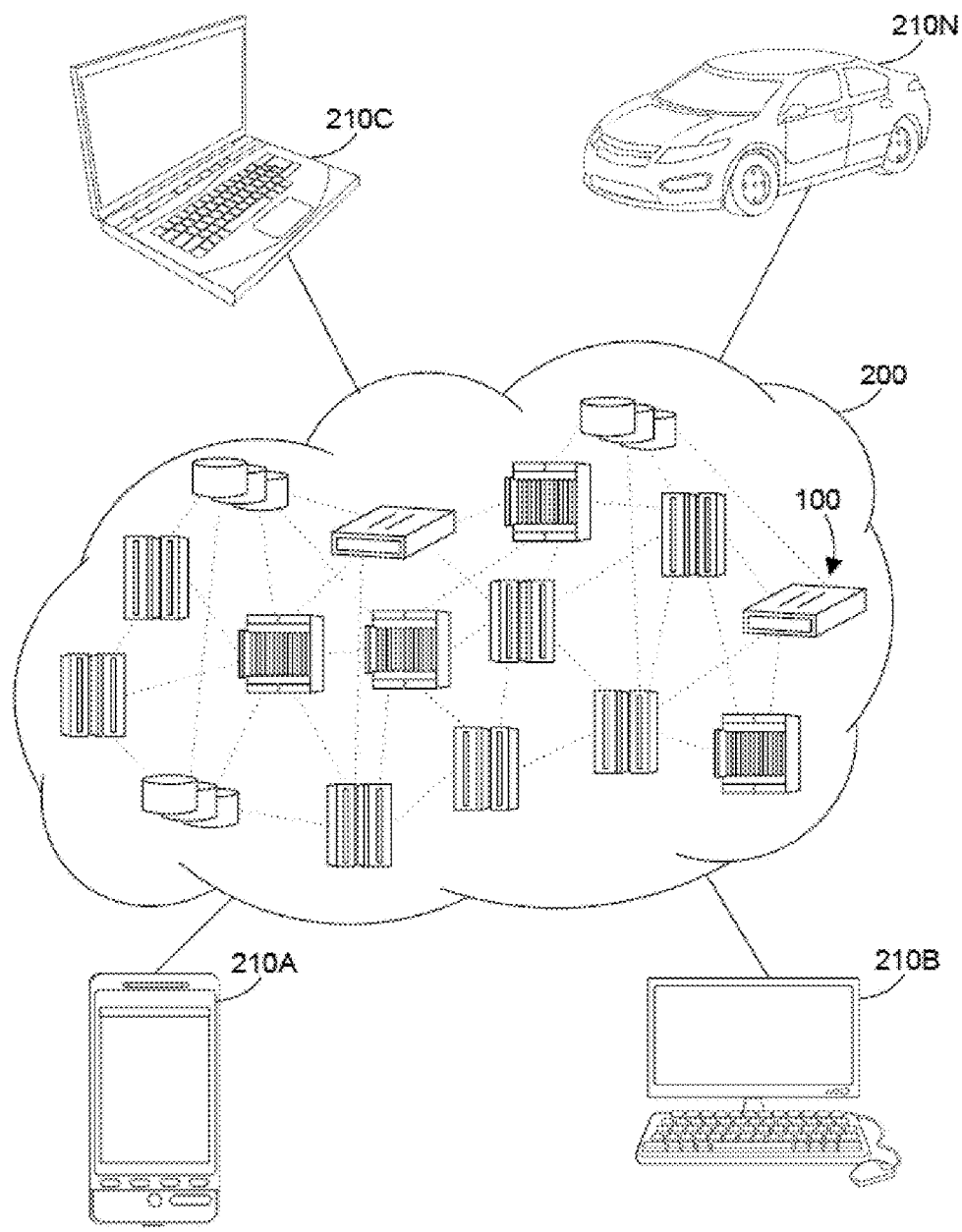
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
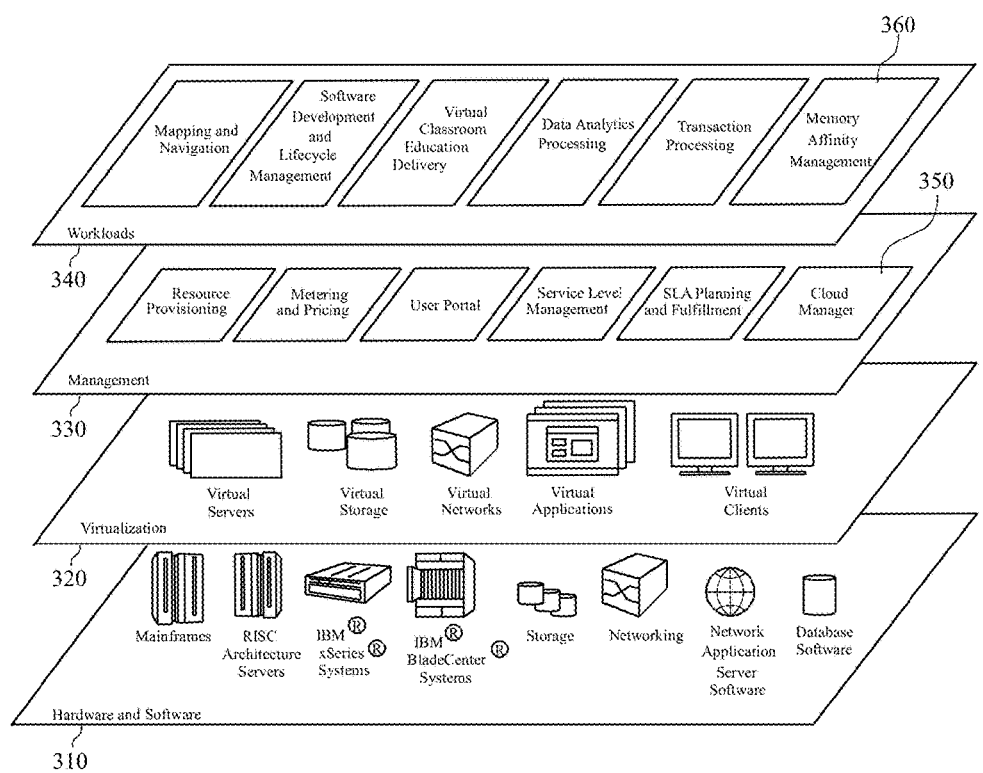
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes; RISC (Reduced Instruction Set Computer) architecture based servers; storage devices; networks and networking components. Examples of software components include network application server software; and database software.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and memory affinity management 360, which may be utilized as discussed in more detail below.

Figure 4:
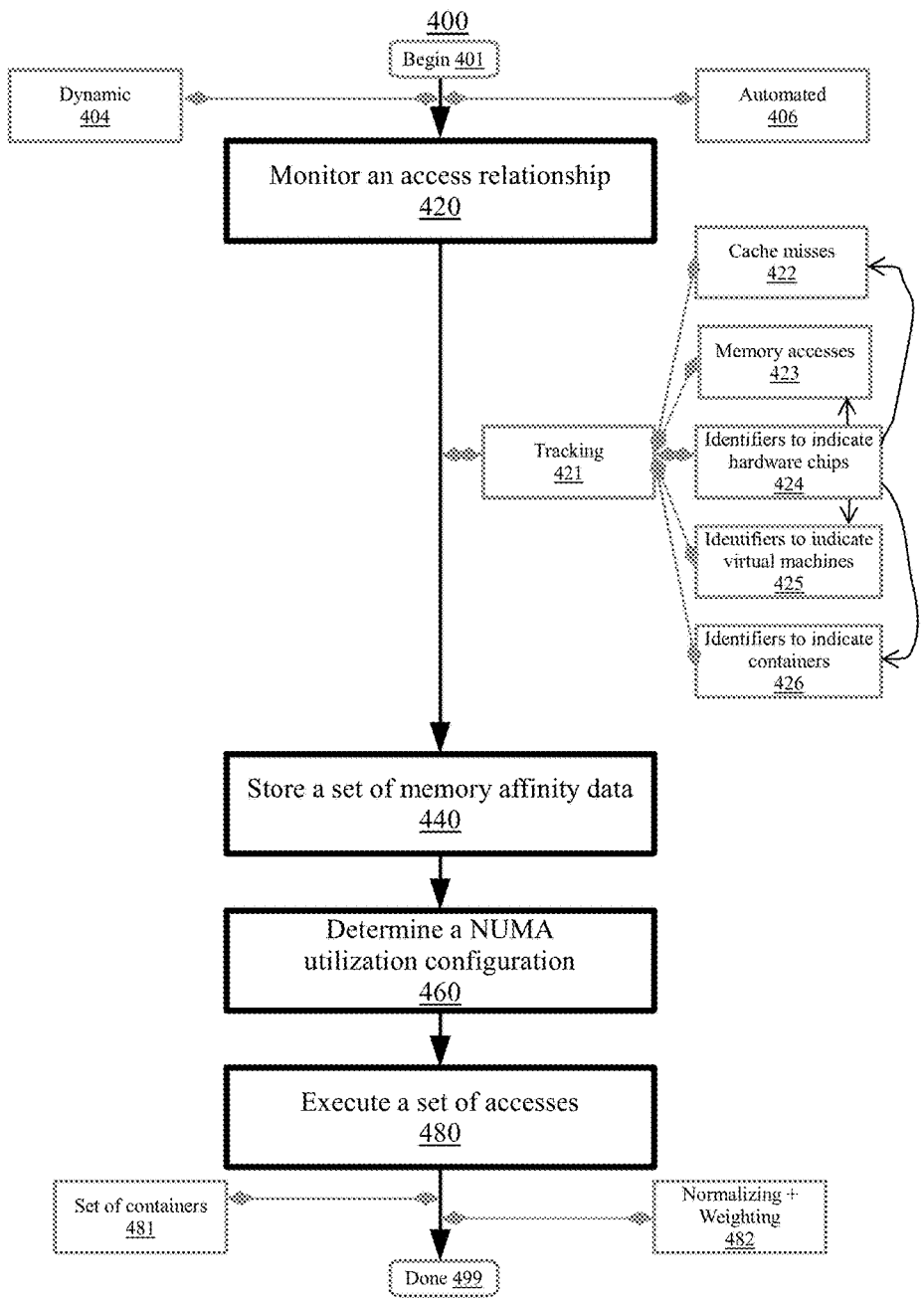
FIG. 4 is a flowchart illustrating a method for memory affinity management in a shared pool of configurable computing resources that utilizes non-uniform memory access (NUMA), according to embodiments.

FIG. 4 is a flowchart illustrating a method 400 for memory affinity management in a shared pool of configurable computing resources that utilizes non-uniform memory access (NUMA), according to embodiments. Aspects of the disclosure relate to a hardware-assisted estimation technique for memory access affinity tracking for a software context such as a set of containers, a set of virtual machines, a set of processes, or the like. The hardware-assisted estimation technique tracks which memory non-uniform memory access (NUMA) node serviced the memory access from the given software context. An appropriate affinity estimation may be arrived-at/determined and at least a portion of the data may be provided to a NUMA memory affinity management algorithm which may be included in an operating system layer or a hypervisor layer. Accordingly, disclosed aspects include a hardware cooperative technique to estimate memory affinity of a given software entity (e.g., thread, process, container) which is configured to execute on one or more processor cores/threads with relatively low overhead costs and relatively low complexity of implementation. Other possibilities for memory affinity management are considered.

In embodiments, the monitoring, the storing, the determining, the executing, and the other steps described herein may each be performed in a dynamic fashion at block 404. The steps described herein may be performed in a dynamic fashion to streamline memory affinity management in a shared pool of configurable computing resources that utilizes NUMA. For instance, the monitoring, the storing, the determining, the executing, and the other steps described herein may occur in real-time, ongoing, or on-the-fly. As an example, one or more steps described herein may be performed on-the-fly (e.g., tracking memory accesses of an application from a given processor thread to a memory module attached to a chip in a computer system in real-time) in order to streamline (e.g., facilitate, promote, enhance) memory affinity management in a shared pool of configurable computing resources that utilizes NUMA. Other methods of performing the steps described herein in a dynamic fashion are also possible and considered.

In embodiments, the monitoring, the storing, the determining, the executing, and the other steps described herein may each be performed in an automated fashion at block 406. The steps described herein may be performed in an automated fashion without user intervention. In embodiments, the monitoring, the storing, the determining, the executing, and the other steps described herein may be carried-out by an internal memory affinity management module maintained in a persistent storage device of a local computing device (e.g., network node, multi-node server). In embodiments, the monitoring, the storing, the determining, the executing, and the other steps described herein may be carried-out by an external memory affinity management module hosted by a remote computing device or server (e.g., server accessible via a subscription, usage-based, or other service model). In this way, aspects of memory affinity management may be performed using automated computing machinery without manual action. Accordingly, the steps described herein may be executed in an automated fashion without user intervention or manual action (e.g., using automated computer machinery, fully machine-driven without manual stimuli). Other methods of performing the steps described herein in an automated fashion are also possible and considered.

At block 420, an access relationship is monitored. The access relationship may be between/among a set of hardware memory components and a set of software assets. The set of software assets can include one or more processes, one or more threads, one or more containers, one or more virtual machines, or the like. Generally, monitoring can include scanning, observing, supervising, watching, overseeing, listening, auditing, or otherwise tracking the access relationship. The access relationship may relate to cache misses or memory accesses which occur. For instance, the set of software assets may request to store data to a particular hardware memory component. Other similar requests are possible. As such, monitoring the access relationship may include monitoring an interface between the set of hardware memory components and the set of software assets. Various monitoring configurations are possible and considered.

In embodiments, a set of events is tracked at block 421. The set of events may be tracked using a set of identifiers related to the set of software assets. Such tracking of the set of events may correspond to the access relationship between the set of software assets and the set of hardware memory components. Generally, tracking can include monitoring, surveying, examining, or otherwise tracing the set of events. The set of identifiers can include tags, markers, or other indicators that specify or designate a respective software asset or a respective hardware component.

In embodiments, a set of cache misses is detected at block 422. Detection of the set of cache misses may occur to track the set of events. Generally, detecting can include sensing, discovering, recognizing, resolving, or otherwise identifying the set of cache misses. A cache miss may occur when data is looked-up in a cache memory and is not found (e.g., the cache did not contain the data being looked up, the access/query is not satisfied). Based on and in response to detecting the set of cache misses a respective identifier of the set of identifiers is ascertained. Generally, ascertaining can include computing, resolving, detecting, sensing, identifying, or otherwise determining. The respective identifier may relate to a respective software asset of the set of software assets. The respective identifier may correspond to the set of cache misses. For example, it may be determined that the identifier A12 is for a particular container which has experienced a cache miss. Using the set of cache misses, the set of memory affinity data is collected. Generally, collecting can include acquiring, gathering, obtaining, amassing, assembling, compiling, capturing, accumulating, or otherwise aggregating. In the example, the respective identifier A12 and other data may be recorded. Various possibilities related to cache misses are considered.

In embodiments, a set of memory accesses is detected at block 423. Detection of the set of memory accesses may occur to track the set of events. Generally, detecting can include sensing, discovering, recognizing, resolving, or otherwise identifying the set of memory accesses. A memory access can include an operation of reading or writing information which may be stored in memory. Based on and in response to detecting the set of memory accesses a respective identifier of the set of identifiers is ascertained. Generally, ascertaining can include computing, resolving, detecting, sensing, identifying, or otherwise determining. The respective identifier may relate to a respective software asset of the set of software assets. The respective identifier may correspond to the set of memory accesses. For example, it may be determined that the identifier B34 is for a particular container which has accessed a specific memory address/space. Using the set of memory accesses, the set of memory affinity data is collected. Generally, collecting can include acquiring, gathering, obtaining, amassing, assembling, compiling, capturing, accumulating, or otherwise aggregating. In the example, the respective identifier B34 and other data may be recorded. Various possibilities related to memory accesses are considered.

In embodiments, the set of identifiers is configured at block 424. Generally, configuring can include formulating, arranging, programming, setting-up, instructing, organizing, or otherwise structuring. The set of identifiers may be configured to indicate a set of hardware chips related to the set of software assets. A respective identifier may indicate a respective hardware chip related to a respective software asset. For example, an identifier W23 may represent a first particular hardware processor which performs operations as instructed by a first particular container. For example, an identifier E56 may represent a second particular hardware processor which performs operations as instructed by a second particular container which is different from the first particular container. Accordingly, events related to the hardware chips may be tracked individually (e.g., on a chip-by-chip basis for each hardware processor chip). Various possibilities related to identifiers for hardware chips and software assets are considered. For example, if a set of memory components are associated to a set of hardware chips, the set of identifiers may be configured to indicate the set of hardware chips representing the set of memory components and related to software assets. Specifically, IDs of the set of hardware chips could be used to associate memory to software assets.

In embodiments, the set of identifiers is configured at block 425. Generally, configuring can include formulating, arranging, programming, setting-up, instructing, organizing, or otherwise structuring. The set of identifiers may be configured to indicate a set of virtual machines. A respective identifier may indicate a respective virtual machine thereby tracking the set of events on a virtual-machine-by-virtual-machine basis. For example, an identifier V6 may represent a first specific virtual machine. For example, an identifier V8 may represent a second specific virtual machine which is different from the first specific virtual machine. Accordingly, events of the virtual machines V6 and V8 may be tracked individually (e.g., on a virtual-machine-by-virtual-machine basis). Various possibilities related to identifiers for virtual machines are considered.

In embodiments, the set of identifiers is configured at block 426. Generally, configuring can include formulating, arranging, programming, setting-up, instructing, organizing, or otherwise structuring. The set of identifiers may be configured to indicate a set of containers. A respective identifier may indicate a respective container which utilizes an operating-system-level virtualization technique. For example, an identifier C48 may represent a first container. For example, an identifier C21 may represent a second container which is different from the first container. Accordingly, events related to the containers C48 and C21 may be tracked individually (e.g., on a container-by-container basis). Various possibilities related to identifiers for virtual machines are considered.

At block 440, a set of memory affinity data is stored. Generally, storing can include keeping, collecting, reserving, caching, logging, recording, or otherwise saving. The set of memory affinity data indicates the access relationship between the set of software assets and the set of hardware memory components. The set of memory affinity data may include various identifiers as described herein. The access relationship may relate to cache misses or memory accesses which occur, as described herein. As such, the set of memory affinity data may indicate/represent which software thread, CPU core, container, etc. is accessing (e.g., reading from, writing to) various respective regions of memory (e.g., based on memory address/location or the like).

At block 460, a NUMA utilization configuration with respect to the set of software assets is determined. Generally, determining can include formulating, resolving, computing, calculating, identifying, or otherwise ascertaining. The NUMA utilization configuration may be determined using the set of memory affinity data. The NUMA utilization configuration may indicate which components generally access which memory modules. The components may be assets, processor chips, etc. As such, various algorithms may be utilized for performance or efficiency benefits. By analyzing the set of memory affinity data, candidate NUMA utilization configurations may be determined and a chosen NUMA utilization configuration may be selected. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use to determine the NUMA utilization configuration. Various possibilities for NUMA utilization configurations are considered.

At block 480, a set of accesses pertaining to the set of software assets and the set of hardware memory components is executed. Generally, executing can include carrying-out, accomplishing, implementing, completing, initiating, enacting, instantiating, or otherwise performing the set of accesses. The execution may be performed based on the NUMA utilization configuration. For instance, the NUMA utilization configuration may indicate that a first processor chip is to generally access a first memory module and a second processor chip is to generally access a second memory module. Accordingly, access requests from the first processor chip are routed to the first memory module and access requests from the second processor chip are routed to the second memory module. Similar access patterns may be arranged for various assets such as containers, virtual machines, threads, processes, or the like. Various possibilities are considered.

In embodiments, a set of containers may be used at block 481. The access relationship between the set of hardware memory components and the set of containers may be monitored. The set of containers may utilize an operating-system-level virtualization technique such as a Linux Container (LXC; trademark of Linus Torvalds) or Docker (trademark of Docker, Inc.). The set of memory affinity data which indicates the access relationship between the set of containers and the set of hardware memory components may be stored. Using the set of memory affinity data, the NUMA utilization configuration with respect to the set of containers which utilizes the operating-system-level virtualization technique can be determined. Based on the NUMA utilization configuration, the set of accesses pertaining to the set of software assets and the set of hardware memory components may be executed. Use the set of containers may be carried-out consistent with various aspects described herein.

In embodiments, a normalizing operation and a weighting/scaling operation may be performed at block 482. The set of memory affinity data may be normalized to determine the NUMA utilization configuration with respect to the set of software assets. Generally, normalizing can include standardizing, assimilating, classifying, categorizing, homogenizing, or otherwise assembling the set of memory affinity data. For example, outliers may be excluded and various baselines or benchmarks such as averages may be computed. The set of memory affinity data may be weighted/scaled to determine the NUMA utilization configuration with respect to the set of software assets. Generally, weighting/scaling can include prioritizing, emphasizing, biasing, accentuating, or otherwise assigning greater priority or preference to one or more data elements. For example, a first memory module may be weighted/scaled differently from a second memory module. Similarly, a first hardware chip may be weighted/scaled differently from a second hardware chip, a first software asset may be weighted/scaled differently from a second software asset, and so on. Based on and in response to both normalizing the set of memory affinity data and weighting/scaling the set of memory affinity data, the NUMA utilization configuration with respect to the set of software assets may be determined. As such, an access routing pattern may be established for various features (e.g., which containers route to which memory modules). Other possibilities are considered. The affinity data may be accumulated and weighted by a micro-code engine.

Method 400 concludes at block 499. Aspects of method 400 may provide performance or efficiency benefits for memory affinity management in a shared pool of configurable computing resources that utilizes NUMA. Aspects may save resources such as bandwidth, disk, processing, or memory. Aspects may facilitate local memory access for the NUMA utilization configuration.

Figure 5:
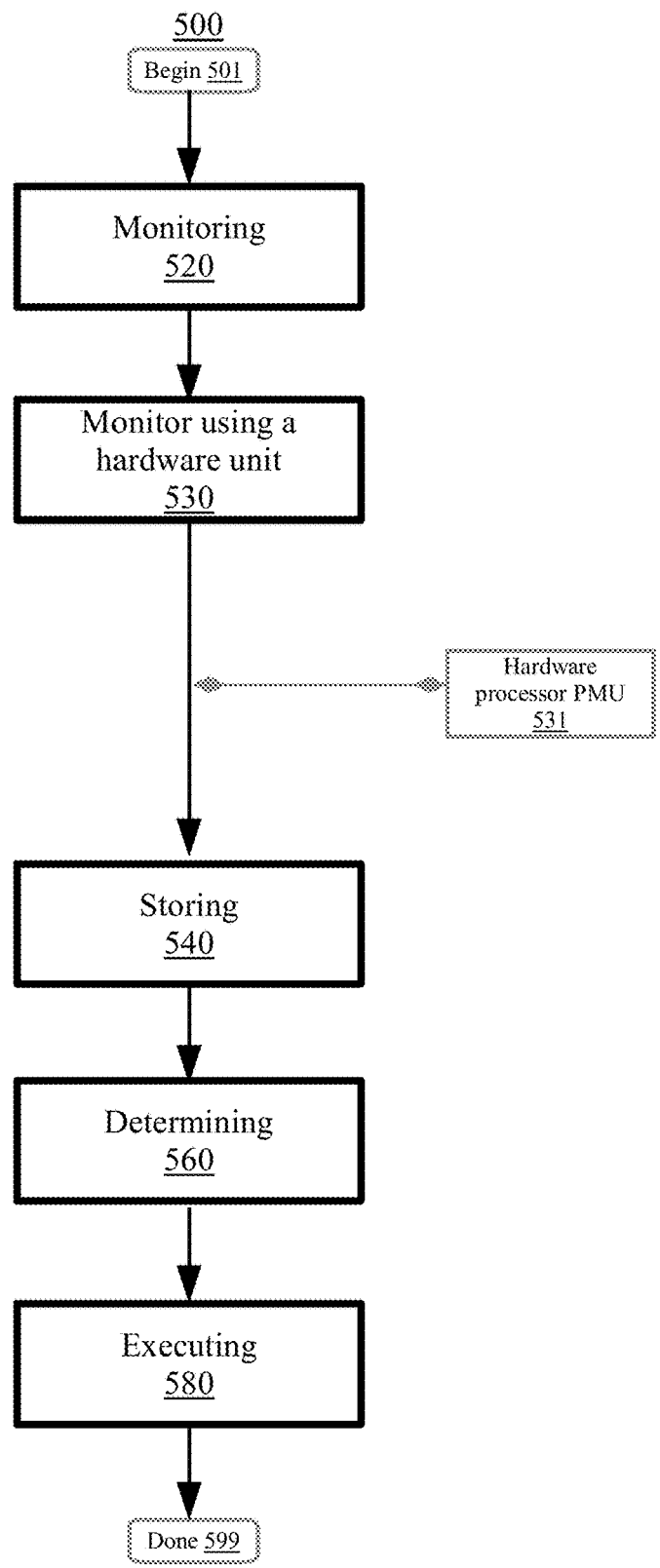
FIG. 5 is a flowchart illustrating a method for memory affinity management in a shared pool of configurable computing resources that utilizes non-uniform memory access (NUMA), according to embodiments.

FIG. 5 is a flowchart illustrating a method 500 for memory affinity management in a shared pool of configurable computing resources that utilizes non-uniform memory access (NUMA), according to embodiments. At block 520, an access relationship is monitored. The access relationship may be between/among a set of hardware memory components and a set of software assets.

In embodiments, the access relationship between the set of hardware memory components and the set of software assets is monitored at block 530. The monitoring may be carried-out/performed using a hardware unit which is coupled with (e.g., attached to) a hardware processor component. The hardware unit may be structured to include a hardware processor performance monitoring unit (PMU) at block 531. Generally, structuring can include building, forming, organizing, assembling, creating, constructing, arranging, or otherwise establishing the hardware unit. The hardware processor PMU may be configured to monitor a set of events corresponding to the access relationship between the set of software assets and the set of hardware memory components. Generally, configuring can include formulating, arranging, programming, setting-up, instructing, organizing, or otherwise structuring. The hardware processor PMU may include on-chip hardware that monitors micro-architectural events such as memory accesses, elapsed cycles, cache hits, cache misses, or the like. Based on the set of events, the set of memory affinity data may be collected. Generally, collecting can include acquiring, gathering, obtaining, amassing, assembling, compiling, capturing, accumulating, or otherwise aggregating the set of memory affinity data.

At block 540, the set of memory affinity data may be stored in a special purpose register or a performance management counter. The hardware unit may carry-out/perform the storing. The set of memory affinity data indicates the access relationship between the set of software assets and the set of hardware memory components. The special purpose register may be coupled with or located on a processor core. The special purpose register may be a hardware-software interface to capture memory affinity data/information for a given software context identifier which can be readily consumed by a PMU framework in an operating system. Various possibilities are considered.

At block 560, a NUMA utilization configuration with respect to the set of software assets is determined. The NUMA utilization configuration may be determined using the set of memory affinity data. At block 580, a set of accesses pertaining to the set of software assets and the set of hardware memory components is executed. The execution may be performed based on the NUMA utilization configuration. Method 500 concludes at block 599. Aspects of method 500 may provide performance or efficiency benefits for memory affinity management in a shared pool of configurable computing resources that utilizes NUMA. Aspects may save resources such as bandwidth, disk, processing, or memory. Aspects may facilitate local memory access for the NUMA utilization configuration.

Figure 6:
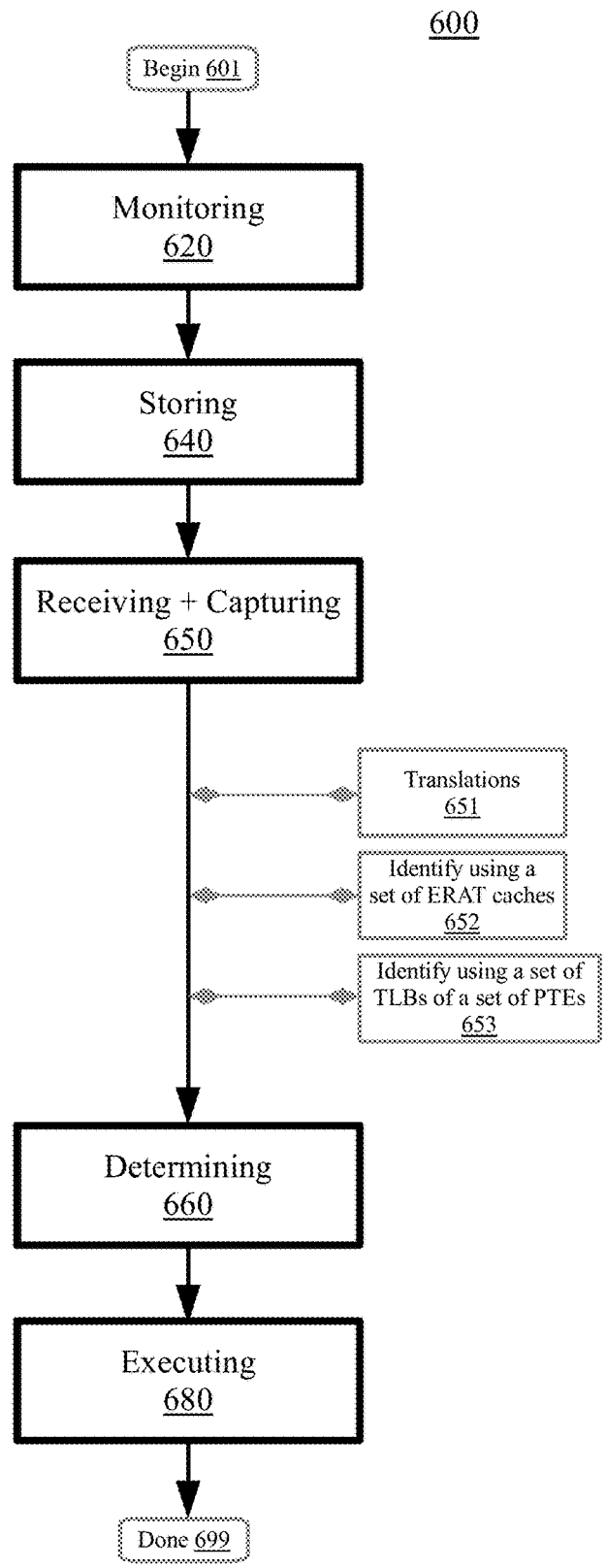
FIG. 6 is a flowchart illustrating a method for memory affinity management in a shared pool of configurable computing resources that utilizes non-uniform memory access (NUMA), according to embodiments.

FIG. 6 is a flowchart illustrating a method 600 for memory affinity management in a shared pool of configurable computing resources that utilizes non-uniform memory access (NUMA), according to embodiments. At block 620, an access relationship is monitored. The access relationship may be between/among a set of hardware memory components and a set of software assets. At block 640, a set of memory affinity data is stored. The set of memory affinity data indicates the access relationship between the set of software assets and the set of hardware memory components.

At block 650, a set of access requests is received from a set of hardware processors. Generally, receiving can include detecting, sensing, discovering, recognizing, resolving, identifying, or otherwise accepting delivery of the set of access requests. Pertaining to the set of memory affinity data and in response to receiving the set of access requests from the set of hardware processors, a set of identifiers of the set of hardware processors is captured. Generally, capturing can include collecting, obtaining, acquiring, recording, or otherwise ingesting the set of identifiers. For example, when a given access request occurs, an identifier associated with a specific hardware process may be captured. As such, chip identification information may be gathered through accurate hardware implementation. The set of memory affinity data may include such information. A set of identifiers of the set of memory devices attached to the hardware processors may be captured, pertaining to the set of memory affinity data and in response to receiving the set of access requests, from the set of hardware processors.

At block 651, a hardware processor memory management unit (MMU) logic may carry-out a set of translations of a set of effective addresses (e.g., logical or virtual addresses) to a set of real addresses (e.g., physical addresses). The set of translations, which pertain to the set of memory affinity data, may be cached in a set of effective-to-real address translation (ERAT) caches. At block 652, a new access request may be received from an individual hardware processor of the set of hardware processors. Using a set of effective-to-real address translation (ERAT) caches, the individual hardware processor of the set of hardware processors may be identified (e.g., identifying the originating hardware processor of the new access request). Pertaining to the set of memory affinity data, the new access request may be logged (e.g., data saved into the set of memory affinity data). At block 653, a new access request from an individual hardware processor of the set of hardware processors may be received. Using a set of translation lookaside buffers (TLBs) of a set of page table entries (PTEs), the individual hardware processor of the set of hardware processors may be identified. Pertaining to the set of memory affinity data, the new access request may be logged. Various possibilities are considered. Such hardware implementation may include enhancing hardware to provide source chip ID or source memory node identifier information which is stored in ERAT so that memory affinity can be derived. The set of translations which pertain to the set of memory affinity data may be cached in a set of effective-to-real address translation (ERAT) caches, in the form of memory device IDs to which the destination pages belongs.

At block 660, a NUMA utilization configuration with respect to the set of software assets is determined. The NUMA utilization configuration may be determined using the set of memory affinity data. At block 680, a set of accesses pertaining to the set of software assets and the set of hardware memory components is executed. The execution may be performed based on the NUMA utilization configuration. Method 600 concludes at block 699. Aspects of method 600 may provide performance or efficiency benefits for memory affinity management in a shared pool of configurable computing resources that utilizes NUMA. Aspects may save resources such as bandwidth, disk, processing, or memory. Aspects may facilitate local memory access for the NUMA utilization configuration.

FIG. 7 illustrates an example 700 related to memory affinity management in a shared pool of configurable computing resources that utilizes non-uniform memory access (NUMA), according to embodiments. The example 700 illustrates a possible data format for saving the set of memory affinity data. For example, four bits may be reserved for counting a number of memory accesses from a given chip (e.g., in a sixteen chip system). To capture page misses, extra special purpose registers may be utilized. In certain embodiments, only certain misses may be counted by a PMU to keep a quantity of misses. Various statistics of the set of memory affinity data can be accumulated in memory pointed by a per-thread special purpose register so that core in-memory-accumulator hardware can update/increment a memory location for each respective software context (e.g., thread). One or more chips may have a number of significant caches misses over a sampling interval.

Figure 8:
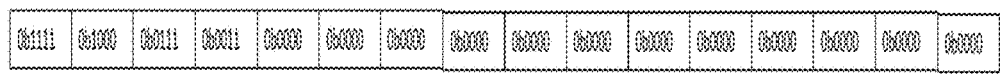
FIG. 8 illustrates an example related to memory affinity management in a shared pool of configurable computing resources that utilizes non-uniform memory access (NUMA), according to embodiments.

FIG. 8 illustrates an example 800 related to memory affinity management in a shared pool of configurable computing resources that utilizes non-uniform memory access (NUMA), according to embodiments. In the example 800, a virtual machine may have allocated its memory behind the first four memory chips. As depicted, the very first chip may be experiencing more memory accesses than the others. Such information can be utilized by a memory affinity management software in an operating system.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for memory affinity management in a shared pool of configurable computing resources that utilizes non-uniform memory access (NUMA), the method comprising:
  monitoring an access relationship between a set of hardware memory components and a set of software assets;
  storing a set of memory affinity data which indicates the access relationship between the set of software assets and the set of hardware memory components;

determining, using the set of memory affinity data, a NUMA utilization configuration with respect to the set of software assets;

executing, based on the NUMA utilization configuration, a set of accesses pertaining to the set of software assets and the set of hardware memory components;

monitoring the access relationship between the set of hardware memory components and a set of containers which utilizes an operating-system-level virtualization technique;

storing the set of memory affinity data which indicates the access relationship between the set of containers and the set of hardware memory components;

determining, using the set of memory affinity data, the NUMA utilization configuration with respect to the set of containers which utilizes the operating-system-level virtualization technique;

executing, based on the NUMA utilization configuration, the set of accesses pertaining to the set of software assets and the set of hardware memory components;

tracking, using a set of identifiers related to the set of software assets, a set of events corresponding to the access relationship between the set of software assets and the set of hardware memory components;

detecting a set of cache misses;

ascertaining, based on and in response to detecting the set of cache misses, a respective identifier of the set of identifiers which relates to a respective software asset of the set of software assets, and corresponds to the set of cache misses;

collecting, using the set of cache misses, the set of memory affinity data;

monitoring, using a hardware unit which is coupled with a hardware processor component, the access relationship between the set of hardware memory components and the set of software assets;

storing, in a special purpose register by the hardware unit, the set of memory affinity data which indicates the access relationship between the set of software assets and the set of hardware memory components;

structuring the hardware unit to include a hardware processor performance monitoring unit (PMU);

configuring the hardware processor PMU to monitor a set of events corresponding to the access relationship between the set of software assets and the set of hardware memory components;

collecting, based on the set of events, the set of memory affinity data;

receiving a set of access requests from a set of hardware processors;

capturing, pertaining to the set of memory affinity data and in response to receiving the set of access requests from the set of hardware processors, a set of identifiers of the set of hardware processors;

carrying-out, by a hardware processor memory management unit (MMU) logic, a set of translations of a set of effective addresses to a set of real addresses;

caching, in a set of effective-to-real address translation (ERAT) caches, the set of translations which pertain to the set of memory affinity data;

receiving a new access request from an individual hardware processor of the set of hardware processors;

identifying, using the set of effective-to-real address translation (ERAT) caches, the individual hardware processor of the set of hardware processors;

logging, pertaining to the set of memory affinity data, the new access request;

normalizing the set of memory affinity data to determine the NUMA utilization configuration with respect to the set of software assets;

weighting the set of memory affinity data to determine the NUMA utilization configuration with respect to the set of software assets; and determining, based on and in response to both normalizing the set of memory affinity data and weighting the set of memory affinity data, the NUMA utilization configuration with respect to the set of software assets.

* * * * *